US009701295B2

United States Patent
Bunk et al.

(10) Patent No.: US 9,701,295 B2
(45) Date of Patent: Jul. 11, 2017

(54) METHOD FOR CONTROLLING A HIGH-PRESSURE SELECTOR VALVE IN A HYDRAULIC MOTOR VEHICLE BRAKE SYSTEM

(75) Inventors: Michael Bunk, Leingarten (DE); Jose-Maria Rodelgo Lucas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 832 days.

(21) Appl. No.: 13/502,713

(22) PCT Filed: Sep. 13, 2010

(86) PCT No.: PCT/EP2010/063370
§ 371 (c)(1),
(2), (4) Date: Jun. 28, 2012

(87) PCT Pub. No.: WO2011/051046
PCT Pub. Date: May 5, 2011

(65) Prior Publication Data
US 2012/0256479 A1    Oct. 11, 2012

(30) Foreign Application Priority Data

Oct. 26, 2009  (DE) .................. 10 2009 045 993

(51) Int. Cl.
*B60T 13/66* (2006.01)
*B60T 8/36* (2006.01)
*B60T 8/40* (2006.01)
*B60T 8/48* (2006.01)
*B60T 13/68* (2006.01)

(52) U.S. Cl.
CPC .............. *B60T 13/662* (2013.01); *B60T 8/36* (2013.01); *B60T 8/4059* (2013.01); *B60T 8/4872* (2013.01); *B60T 13/686* (2013.01)

(58) Field of Classification Search
CPC ........ B60T 8/36; B60T 8/4059; B60T 8/4872; B60T 13/662; B60T 13/686
USPC ................... 303/3, 15, 199, 119.1, 119.2, 20
See application file for complete search history.

(56) References Cited

U.S. PATENT DOCUMENTS

| 5,823,640 A | 10/1998 | Eichhorn et al. |
| 6,984,004 B2 * | 1/2006 | Breitenbacher et al. ..... 303/156 |
| 2004/0183366 A1 | 9/2004 | Kamiya et al. |

FOREIGN PATENT DOCUMENTS

| CN | 1156430 | 8/1997 |
| DE | 195 25 538 | 1/1996 |
| DE | 196 20 037 | 11/1997 |
| DE | 100 59 348 | 6/2001 |

(Continued)

OTHER PUBLICATIONS

International Search Report for PCT/EP2010/063370, dated Nov. 24, 2010.

*Primary Examiner* — Thomas Irvin
(74) *Attorney, Agent, or Firm* — Norton Rose Fulbright US LLP; Gerard Messina

(57) ABSTRACT

In a method for controlling a selector valve situated in a hydraulic brake system of a motor vehicle, the selector valve is opened by applying an electrical signal having various control phases having different current intensities. The thermal load and the noise of the valve are significantly improved if the lengths of the control phases for the pilot stage or the holding phases are variably adapted to the driving situation.

10 Claims, 3 Drawing Sheets

(56) References Cited

FOREIGN PATENT DOCUMENTS

| | | |
|---|---|---|
| DE | 102 27 785 | 9/2003 |
| DE | 10 2006 024 361 | 11/2007 |
| JP | 10-504259 | 4/1998 |
| JP | 10-157595 | 6/1998 |
| JP | 2006-17181 | 1/2006 |
| JP | 2006-103440 | 4/2006 |

* cited by examiner

METHOD FOR CONTROLLING A HIGH-PRESSURE SELECTOR VALVE IN A HYDRAULIC MOTOR VEHICLE BRAKE SYSTEM

BACKGROUND OF THE INVENTION

1. Field of the Invention

The present invention relates to a method for controlling a valve in a hydraulic brake system.

2. Description of Related Art

Modern brake systems, which are designed for a vehicle dynamics control system, normally have multiple valves, which may be used for switching between a foot-operated braking operation and an automatic braking operation.

FIG. 1 shows the essential part for the present invention of a hydraulic brake system, which is designed for implementing a vehicle dynamics control system. The part of the brake system shown includes a brake master cylinder 1, a switchover valve (USV) 2, which is normally open, a high-pressure selector valve (HSV) 3, which is normally closed, a hydraulic pump (HP) 4, and a wheel brake 5 situated on the wheel. HSV 3 is normally designed as a two-stage valve; however, it may also be designed as a single-stage valve.

The brake line exiting brake master cylinder 1 branches to USV 2 and to HSV 3. The corresponding lines are denoted by reference numerals 6 and 7. Hydraulic pump 4, which is situated downstream from HSV 3, is able to transport brake fluid from brake master cylinder 1 to wheel brakes 5 when USV 2 is open, and thus automatically build up the brake pressure in the wheel brakes.

In the case of a normal braking process in which the brake slip on the wheels is low, i.e., the vehicle dynamics regulator is not active, a specific brake pressure builds up depending on the intensity of the foot pedal actuation on brake master cylinder 1. This brake pressure is relayed to wheel brake 5 via open USV 2 along the path denoted by arrows a. HSV 3 is closed in this case. The vehicle is then decelerated in accordance with the driver input.

As soon as the wheel slip exceeds a specific threshold in a braking or acceleration maneuver, a vehicle dynamics regulator or another driver assistance system, such as ACC or TCS, is controlled and automatically increases the brake pressure acting on brake 5. In this case, a regulator 8 determines a setpoint brake pressure which is to act on wheel brake 5. This brake pressure is normally set by a corresponding input of a setpoint speed for hydraulic pump 4. During the pressure regulation, USV 2 is closed and HSV 3 is open. Hydraulic pump 4 then delivers brake fluid along the path denoted by arrows b from brake master cylinder 1 via brake line 7 to the wheel brake, thus building up the necessary pressure.

To ensure that hydraulic pump 4 is able to obtain a sufficient amount of brake fluid from the brake fluid reservoir, it must be ensured that HSV 3 opens quickly and widely enough. From the related art, it is known to actuate HSV 3 with the aid of an electrical signal having various phases, as shown in FIGS. 2 and 3.

FIGS. 2 and 3 show typical curves of control current $I_{HSV}$ for an HSV 3. In this connection, FIG. 2 shows the current curve for a two-stage HSV 3 and FIG. 3 shows the current curve for a single-stage HSV 3.

In the case of a two-stage HSV 3 (FIG. 2), the application of a current $I_V$ initially opens a valve pilot stage which releases a small flow cross section. This causes the differential pressure prevailing on valve 3 to be reduced slowly. Since the differential pressure applied to HSV 3 has the effect of closing HSV 3, this makes it easier to open the main stage in a second step. After the end of a predefined time span $t_V$, a higher current $I_R$ is then applied for a short period of time $t_R$ (refresh pulse 9) in order to completely open the main stage of the valve. This is followed by a holding phase of duration $t_H$ having a lower current $I_H$, which is set in such a way that valve 3 remains open. To ensure that the valve remains open in any case, refresh pulses 9 are applied regularly. Refresh pulses 9 are each in turn followed by a holding phase $t_H$ having a lower current value $I_H$.

In the case of a single-stage HSV 3 (FIG. 3), the pilot stage is omitted, i.e., the process begins by applying a pulse 9, followed by a holding phase $t_H$ having a current $I_H$. This is followed periodically by additional pulses 9 and holding phases $t_H$.

The control methods known from the related art have in common that length $t_V$ of the control of the pilot stage, as well as the lengths of holding phases $t_H$, are fixedly predefined. This results in the problem that the main stage is always opened by a refresh pulse 9 after a fixedly predefined period of time $t_V$, even if the situation actually allowed a longer control of the pilot stage. If the valve is opened, the problem results that a refresh pulse 9 is always generated after a predefined holding time $t_H$, even if holding time $t_H$ could be longer in the relevant situation. The result of this is that the valve switches unnecessarily often in many situations, causing the noise load to be relatively high. Furthermore, an excessively high electrical power usually flows through the coil of the HSV, making it possible for the valve to be heated to an unnecessarily high degree and overheat in the extreme case for example, long duration of a braking maneuver).

BRIEF SUMMARY OF THE INVENTION

An object of the present invention is therefore to reduce the noise production and the thermal load of the valve.

According to the present invention, it is proposed that the duration over time of at least one control phase ($t_V$, $t_H$, $t_R$) of the selector valve as a function of at least one braking parameter be set in order to thus adapt the control of the valve to the particular driving situation. Phases $t_V$, $t_R$ and/or $t_H$ thus have a variable length which is dependent on the instantaneous driving situation. This makes it possible to optimize both the noise production and the thermal load of the valve.

According to one preferred specific embodiment, at least one of the following parameters is used as a braking parameter: a setpoint speed of the hydraulic pump (setpoint pump speed) calculated by a regulator and/or a required increase in the setpoint pump pressure over time (setpoint pressure gradient) and/or a difference between the brake master cylinder pressure applied by the driver and a setpoint pressure (differential pressure) requested by the regulator. These parameters are normally available in conventional assistance systems such as ESP, TCS and ACC and may be used without difficulty.

The proposed method is applicable to both a single-stage and a two-stage valve. In the case of a single-stage valve, the duration of the holding phases and/or the refresh pulses is calculated from one or multiple parameters. In the case of a two-stage HSV, alternatively or additionally, the control duration of the pilot stage may also be calculated, depending on the situation.

The duration of the holding phases preferably ranges between 100 ms and multiple seconds. In the case of a two-stage valve, the duration of the control preferably ranges between 0 ms and 200 ms.

The above-named valve is preferably a high-pressure selector valve, which is situated between the brake master cylinder and a hydraulic pump in a motor vehicle brake circuit.

DETAILED DESCRIPTION OF THE INVENTION

Figure 1:
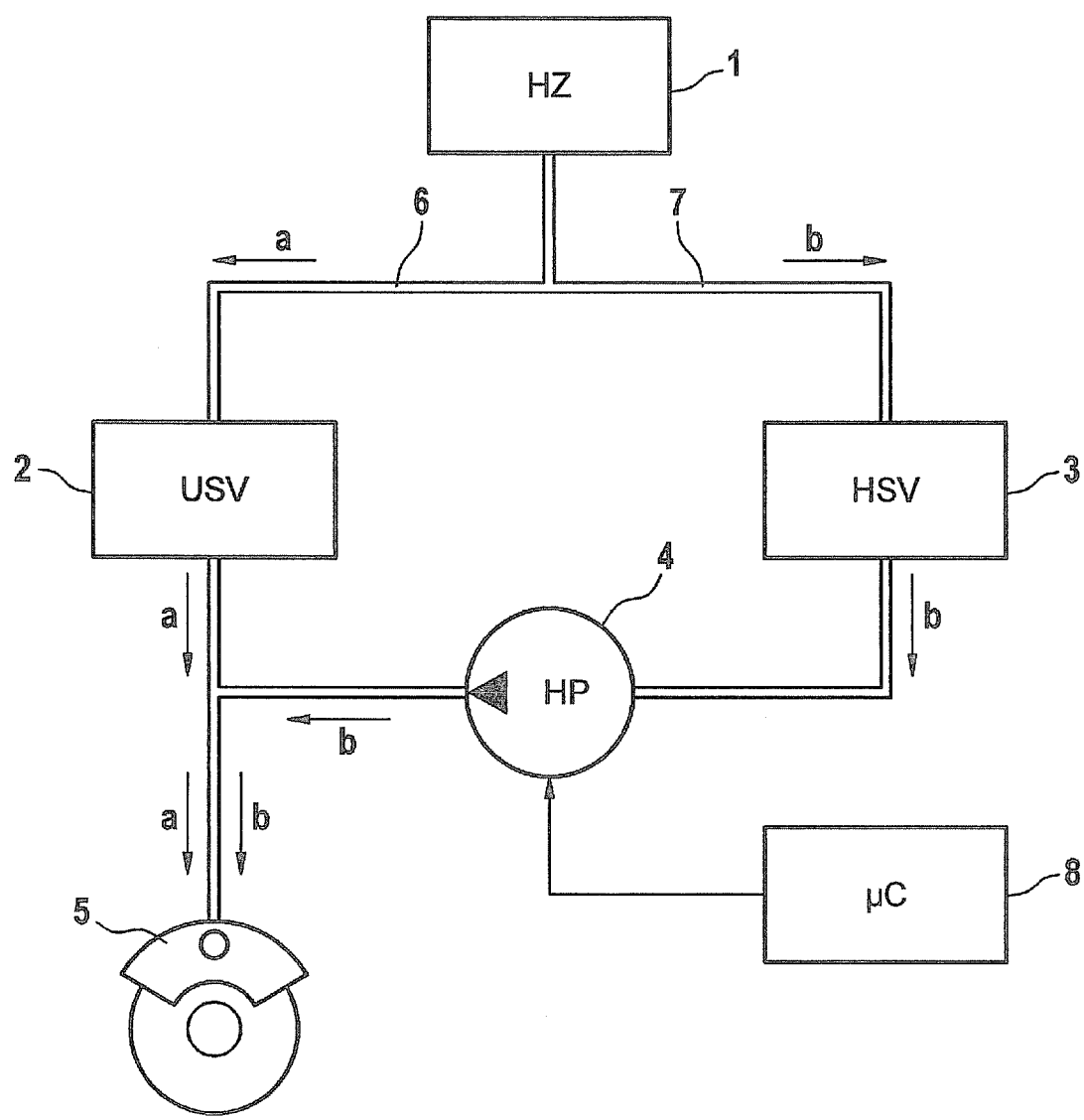
FIG. 1 shows a part of a hydraulic brake system known from the related art which is designed for a vehicle dynamics control system.
Figure 2:
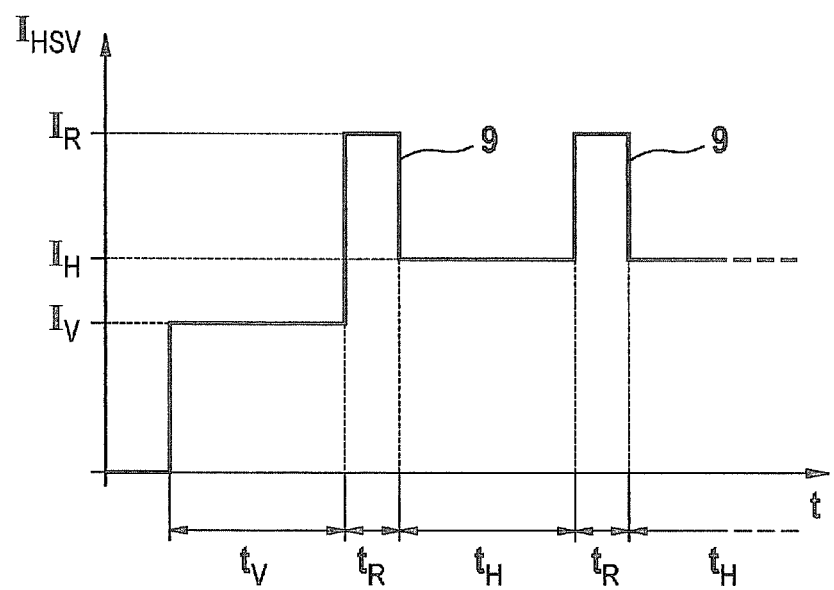
FIG. 2 shows the curve of the control signal for a two-stage selector valve.
Figure 3:
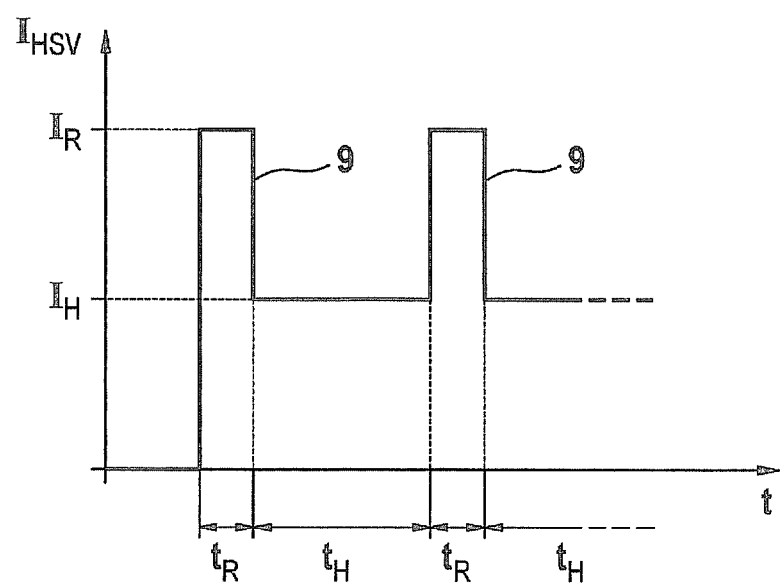
FIG. 3 shows the curve of the control signal for a single-stage selector valve.

FIGS. 2 and 3 show an exemplary curve of the control signal for a two-stage (FIG. 2) and a single-stage (FIG. 3) valve 3. As has already been explained above, the current signal includes a control phase $t_V$, in which the pilot stage of valve 3 is controlled using a current $I_V$, followed by an impulse 9 of duration $t_R$, which is used for opening the main stage of valve 3 through a high current $I_R$, and a holding phase $t_H$, in which valve 3 is held open with the aid of a lower current $I_H$. Subsequently, refresh pulse 9 and holding phases $t_H$ are repeated periodically.

According to the present invention, the duration of one or multiple phases $t_V$, $t_R$ and $t_H$ is variable, depending on a braking parameter. This makes it possible to adapt the control of valve 3 to the instantaneous driving situation. It is easily recognizable that a prolongation of duration $t_V$ or of holding phases $t_H$, for example, may considerably reduce the entire converted electrical power ($\sim I^2_{HSV}$). Moreover, a prolongation of holding phases $t_H$ reduces the number of pulses 9 per unit of time.

The length of individual phases $t_V$, $t_H$, $t_R$ is preferably a function of a setpoint speed of the hydraulic pump (setpoint pump speed) calculated by regulator 8 and/or a required increase in the setpoint pump pressure over time (setpoint pressure gradient) and/or a difference between the master brake cylinder pressure applied by the driver and a setpoint pressure (differential pressure) requested by regulator 8. The present invention is, however, not limited to one of these variables, making it possible to use other parameters as well.

Figure 4:
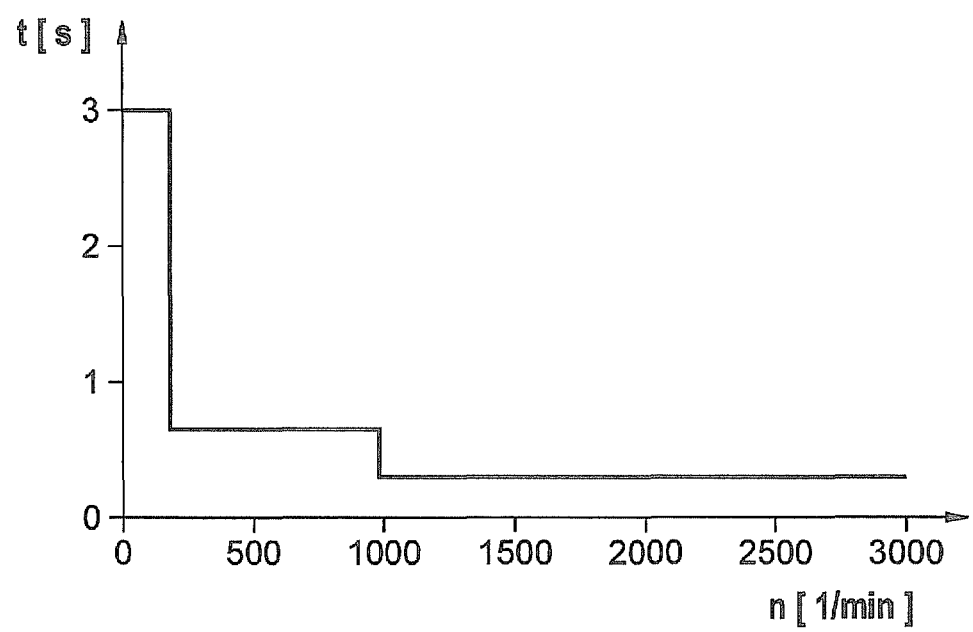
FIG. 4 shows the exemplary characteristic curve of the length of the holding phase as a function of the setpoint pump speed.

With reference to FIG. 4, the dependency of the length of holding phase $t_H$ on the setpoint pump speed is described in the following, as an example. FIG. 4 shows the length of holding phase $t_H$ as a function of setpoint speed n. It is apparent in this that the duration of holding phase $t_H$ may amount to multiple seconds (3 sec. in this case) in the case of rather uncritical braking processes having low dynamics in which low setpoint pump speeds n are necessary. In the case of a somewhat higher setpoint pump speed n between 100 rpm and 1000 rpm, duration $t_H$ amounts to approximately 0.5 sec. Only if the setpoint pump speeds exceed 1000 rpm does the duration of holding phase $t_H$ fall to approximately 100 ms. This makes it possible to set holding phase $t_H$ to be relatively long across broad speed ranges.

What is claimed is:

1. A method for controlling a selector valve situated in a hydraulic brake system of a motor vehicle, comprising:
opening the selector valve by applying an electrical signal having multiple different control phases; and
setting a time duration of at least one of the control phases as a function of at least one braking parameter;
wherein the control phases include a valve opening phase in which the electrical signal is an impulse.

2. The method as recited in claim 1, wherein at least one of: a set target pump speed, a set target pressure gradient, and a set target differential pressure is used as the at least one braking parameter.

3. The method as recited in claim 1, wherein the selector valve is a single-stage selector valve, and wherein a time duration of one of a refresh pulse or a holding phase is set as a function of the at least one braking parameter.

4. The method as recited in claim 3, wherein the time duration of the holding phase is between approximately 100 ms and three seconds.

5. The method as recited in claim 1, wherein the selector valve is a two-stage selector valve, and wherein a time duration of one of a refresh pulse, a holding phase, or a pilot stage is set as a function of the at least one braking parameter.

6. The method as recited in claim 5, wherein the time duration of the pilot stage is between approximately 0 ms and approximately 200 ms.

7. The method as recited in claim 6, wherein the selector valve is a high pressure selector valve that is configured to be opened in response to exceedance of a wheel slip over a threshold.

8. The method as recited in claim 1, wherein:
the control phases include a holding phase of selectable duration such that the selector valve remains open during the holding phase; and
the holding phase is punctuated by at least one refresh pulse.

9. The method as recited in claim 1, wherein a set target pump speed is used as the at least one braking parameter.

10. A control unit for controlling a selector valve situated in a hydraulic brake system of a motor vehicle, comprising:
an actuator unit configured to open the selector valve by applying an electrical signal having multiple different control phases; and
means for setting a processor configured to set a time duration of at least one of the control phases as a function of at least one braking parameter;
wherein the control phases include a valve opening phase in which the electrical signal is an impulse.

* * * * *